(12) United States Patent
Giuffrida et al.

(10) Patent No.: US 9,275,080 B2
(45) Date of Patent: Mar. 1, 2016

(54) SYSTEM AND METHOD FOR EARLY ACCESS TO CAPTURED IMAGES

(71) Applicant: Pictometry International Corp., Rochester, NY (US)

(72) Inventors: Frank D. Giuffrida, Honeoye Falls, NY (US); Chad Skolny, Pittsford, NY (US); Steve Adams, Rush, NY (US); Robert Gray, Canadiagua, NY (US); Chris Schnaufer, Rochester, NY (US)

(73) Assignee: Pictometry International Corp., Rochester, NY (US)

( * ) Notice: Subject to any disclaimer, the term of this patent is extended or adjusted under 35 U.S.C. 154(b) by 195 days.

(21) Appl. No.: 13/833,352

(22) Filed: Mar. 15, 2013

(65) Prior Publication Data

US 2014/0280354 A1    Sep. 18, 2014

(51) Int. Cl.
*G06F 17/30*    (2006.01)

(52) U.S. Cl.
CPC ...... *G06F 17/3028* (2013.01); *G06F 17/30241* (2013.01)

(58) Field of Classification Search
CPC .............. G06F 17/30241; G06F 17/3028
USPC ............................................. 707/769
See application file for complete search history.

(56) References Cited

U.S. PATENT DOCUMENTS

| 2,273,876 | A | 2/1942 | Lutz et al. |
|---|---|---|---|
| 3,153,784 | A | 10/1964 | Petrides et al. |
| 3,594,556 | A | 7/1971 | Edwards |
| 3,614,410 | A | 10/1971 | Bailey |
| 3,621,326 | A | 11/1971 | Hobrough |
| 3,661,061 | A | 5/1972 | Tokarz |
| 3,716,669 | A | 2/1973 | Watanabe et al. |
| 3,725,563 | A | 4/1973 | Woycechowsky |

(Continued)

FOREIGN PATENT DOCUMENTS

| AT | 331204 T | 7/2006 |
|---|---|---|
| BR | 0316110 | 9/2005 |

(Continued)

OTHER PUBLICATIONS

Ackermann, Prospects of Kinematic GPS Aerial Triangulation, ITC Journal, 1992.

(Continued)

*Primary Examiner* — Phong Nguyen
(74) *Attorney, Agent, or Firm* — Dunlap Codding, P.C.

(57) ABSTRACT

Systems and methods are disclosed for early access to captured images including generating and storing within a geospatial database a plurality of placeholder records having information identifying a particular captured image and including at least one geographic image boundary field containing information indicative of a real-world geographic area depicted within the image, an image file location field, and an image status field; receive a plurality of signals from one or more processing computer, at least two of the signals having the information identifying particular captured images, and second information indicative of updates indicating a change in at least one of the image location and image processing status for the image identified by the first information; and populating at least one of the image location and the image processing status of the placeholders within the geospatial database with the information indicative of updates for identified captured images.

10 Claims, 6 Drawing Sheets

(56) References Cited

U.S. PATENT DOCUMENTS

| | | |
|---|---|---|
| 3,864,513 A | 2/1975 | Halajian et al. |
| 3,866,602 A | 2/1975 | Furihata |
| 3,877,799 A | 4/1975 | O'Donnell |
| 4,015,080 A | 3/1977 | Moore-Searson |
| 4,044,879 A | 8/1977 | Stahl |
| 4,184,711 A | 1/1980 | Wakimoto |
| 4,240,108 A | 12/1980 | Levy |
| 4,281,354 A | 7/1981 | Conte |
| 4,344,683 A | 8/1982 | Stemme |
| 4,360,876 A | 11/1982 | Girault et al. |
| 4,382,678 A | 5/1983 | Thompson et al. |
| 4,387,056 A | 6/1983 | Stowe |
| 4,396,942 A | 8/1983 | Gates |
| 4,463,380 A | 7/1984 | Hooks |
| 4,489,322 A | 12/1984 | Zulch et al. |
| 4,490,742 A | 12/1984 | Wurtzinger |
| 4,491,399 A | 1/1985 | Bell |
| 4,495,500 A | 1/1985 | Vickers |
| 4,527,055 A | 7/1985 | Harkless et al. |
| 4,543,603 A | 9/1985 | Laures |
| 4,586,138 A | 4/1986 | Mullenhoff et al. |
| 4,635,136 A | 1/1987 | Ciampa et al. |
| 4,653,136 A | 3/1987 | Denison |
| 4,653,316 A | 3/1987 | Fukuhara |
| 4,673,988 A | 6/1987 | Jansson et al. |
| 4,686,474 A | 8/1987 | Olsen et al. |
| 4,688,092 A | 8/1987 | Kamel et al. |
| 4,689,748 A | 8/1987 | Hofmann |
| 4,707,698 A | 11/1987 | Constant et al. |
| 4,758,850 A | 7/1988 | Archdale et al. |
| 4,805,033 A | 2/1989 | Nishikawa |
| 4,807,024 A | 2/1989 | Mclaurin et al. |
| 4,814,711 A | 3/1989 | Olsen et al. |
| 4,814,896 A | 3/1989 | Heitzman et al. |
| 4,843,463 A | 6/1989 | Michetti |
| 4,899,296 A | 2/1990 | Khattak |
| 4,906,198 A | 3/1990 | Cosimano et al. |
| 4,953,227 A | 8/1990 | Katsuma et al. |
| 4,956,872 A | 9/1990 | Kimura |
| 5,034,812 A | 7/1991 | Rawlings |
| 5,086,314 A | 2/1992 | Aoki et al. |
| 5,121,222 A | 6/1992 | Endoh et al. |
| 5,138,444 A | 8/1992 | Hiramatsu |
| 5,155,597 A | 10/1992 | Lareau et al. |
| 5,164,825 A | 11/1992 | Kobayashi et al. |
| 5,166,789 A | 11/1992 | Myrick |
| 5,191,174 A | 3/1993 | Chang et al. |
| 5,200,793 A | 4/1993 | Ulich et al. |
| 5,210,586 A | 5/1993 | Grage et al. |
| 5,231,435 A | 7/1993 | Blakely |
| 5,247,356 A | 9/1993 | Ciampa |
| 5,251,037 A | 10/1993 | Busenberg |
| 5,265,173 A | 11/1993 | Griffin et al. |
| 5,267,042 A | 11/1993 | Tsuchiya et al. |
| 5,270,756 A | 12/1993 | Busenberg |
| 5,296,884 A | 3/1994 | Honda et al. |
| 5,335,072 A | 8/1994 | Tanaka et al. |
| 5,342,999 A | 8/1994 | Frei et al. |
| 5,345,086 A | 9/1994 | Bertram |
| 5,353,055 A | 10/1994 | Hiramatsu |
| 5,369,443 A | 11/1994 | Woodham |
| 5,402,170 A | 3/1995 | Parulski et al. |
| 5,414,462 A | 5/1995 | Veatch |
| 5,467,271 A | 11/1995 | Abel et al. |
| 5,481,479 A | 1/1996 | Wight et al. |
| 5,486,948 A | 1/1996 | Imai et al. |
| 5,506,644 A | 4/1996 | Suzuki et al. |
| 5,508,736 A | 4/1996 | Cooper |
| 5,555,018 A | 9/1996 | von Braun |
| 5,604,534 A | 2/1997 | Hedges et al. |
| 5,617,224 A | 4/1997 | Ichikawa et al. |
| 5,633,946 A | 5/1997 | Lachinski et al. |
| 5,668,593 A | 9/1997 | Lareau et al. |
| 5,677,515 A | 10/1997 | Selk et al. |
| 5,761,385 A * | 6/1998 | Quinn ............ G06K 9/00476 706/15 |
| 5,798,786 A | 8/1998 | Lareau et al. |
| 5,835,133 A | 11/1998 | Moreton et al. |
| 5,841,574 A | 11/1998 | Willey |
| 5,844,602 A | 12/1998 | Lareau et al. |
| 5,852,753 A | 12/1998 | Lo et al. |
| 5,894,323 A | 4/1999 | Kain et al. |
| 5,899,945 A | 5/1999 | Baylocq et al. |
| 5,963,664 A | 10/1999 | Kumar et al. |
| 6,037,945 A | 3/2000 | Loveland |
| 6,088,055 A | 7/2000 | Lareau et al. |
| 6,094,215 A | 7/2000 | Sundahl et al. |
| 6,097,854 A | 8/2000 | Szeliski et al. |
| 6,108,032 A | 8/2000 | Hoagland |
| 6,130,705 A | 10/2000 | Lareau et al. |
| 6,157,747 A | 12/2000 | Szeliski et al. |
| 6,167,300 A | 12/2000 | Cherepenin et al. |
| 6,222,583 B1 | 4/2001 | Matsumura et al. |
| 6,236,886 B1 | 5/2001 | Cherepenin et al. |
| 6,256,057 B1 | 7/2001 | Mathews et al. |
| 6,373,522 B2 | 4/2002 | Mathews et al. |
| 6,421,610 B1 | 7/2002 | Carroll et al. |
| 6,434,280 B1 | 8/2002 | Peleg et al. |
| 6,597,818 B2 | 7/2003 | Kumar et al. |
| 6,639,596 B1 | 10/2003 | Shum et al. |
| 6,711,475 B2 | 3/2004 | Murphy |
| 6,731,329 B1 | 5/2004 | Feist et al. |
| 6,747,686 B1 | 6/2004 | Bennett |
| 6,810,383 B1 | 10/2004 | Loveland |
| 6,816,819 B1 | 11/2004 | Loveland |
| 6,826,539 B2 | 11/2004 | Loveland |
| 6,829,584 B2 | 12/2004 | Loveland |
| 6,834,128 B1 | 12/2004 | Altunbasak et al. |
| 6,876,763 B2 | 4/2005 | Sorek et al. |
| 6,895,126 B2 * | 5/2005 | Di Bernardo .......... G01C 11/02 348/36 |
| 7,009,638 B2 | 3/2006 | Gruber et al. |
| 7,018,050 B2 | 3/2006 | Ulichney et al. |
| 7,046,401 B2 | 5/2006 | Dufaux et al. |
| 7,061,650 B2 | 6/2006 | Walmsley et al. |
| 7,065,260 B2 | 6/2006 | Zhang et al. |
| 7,123,382 B2 | 10/2006 | Walmsley et al. |
| 7,127,348 B2 | 10/2006 | Smitherman et al. |
| 7,133,551 B2 | 11/2006 | Chen |
| 7,142,984 B2 | 11/2006 | Rahmes et al. |
| 7,184,072 B1 | 2/2007 | Loewen et al. |
| 7,233,691 B2 | 6/2007 | Setterholm |
| 7,262,790 B2 | 8/2007 | Bakewell |
| 7,348,895 B2 | 3/2008 | Lagassey |
| 7,436,408 B2 * | 10/2008 | Hayashi ................ G06T 13/80 345/473 |
| 7,509,241 B2 | 3/2009 | Guo |
| 7,728,833 B2 | 6/2010 | Verma |
| 7,832,267 B2 | 11/2010 | Woro |
| 7,844,499 B2 | 11/2010 | Yahiro |
| 8,078,396 B2 | 12/2011 | Meadow |
| 8,705,843 B2 | 4/2014 | Lieckfeldt |
| 2002/0041328 A1 | 4/2002 | LeCompte et al. |
| 2002/0041717 A1 | 4/2002 | Murata et al. |
| 2002/0047895 A1 * | 4/2002 | Bernardo ............... G01C 11/02 348/48 |
| 2002/0114536 A1 | 8/2002 | Xiong et al. |
| 2003/0014224 A1 | 1/2003 | Guo et al. |
| 2003/0043824 A1 | 3/2003 | Remboski et al. |
| 2003/0063675 A1 * | 4/2003 | Kang ................ H04N 21/8455 375/240.26 |
| 2003/0088362 A1 | 5/2003 | Melero et al. |
| 2003/0164962 A1 | 9/2003 | Nims et al. |
| 2003/0214585 A1 | 11/2003 | Bakewell |
| 2004/0105090 A1 | 6/2004 | Schultz et al. |
| 2004/0167709 A1 | 8/2004 | Smitherman et al. |
| 2004/0189646 A1 * | 9/2004 | Hayashi ................ G06T 13/80 345/473 |
| 2005/0073241 A1 | 4/2005 | Yamauchi et al. |
| 2005/0088251 A1 | 4/2005 | Matsumoto |
| 2005/0169521 A1 | 8/2005 | Hel-Or |
| 2006/0028550 A1 | 2/2006 | Palmer et al. |
| 2006/0092043 A1 | 5/2006 | Lagassey |
| 2006/0238383 A1 | 10/2006 | Kimchi et al. |

(56) References Cited

U.S. PATENT DOCUMENTS

| | | | |
|---|---|---|---|
| 2006/0250515 | A1 | 11/2006 | Koseki et al. |
| 2007/0024612 | A1 | 2/2007 | Balfour |
| 2007/0046448 | A1 | 3/2007 | Smitherman |
| 2007/0237420 | A1 | 10/2007 | Steedly et al. |
| 2008/0120031 | A1 | 5/2008 | Rosenfeld et al. |
| 2008/0123994 | A1 | 5/2008 | Schultz et al. |
| 2008/0158256 | A1 | 7/2008 | Russell et al. |
| 2009/0177458 | A1 | 7/2009 | Hochart et al. |
| 2009/0208095 | A1 | 8/2009 | Zebedin |
| 2009/0304227 | A1 | 12/2009 | Kennedy et al. |
| 2010/0174755 | A1 | 7/2010 | Wei |
| 2010/0277487 | A1* | 11/2010 | Gillespie ............... G06F 9/4401 345/520 |
| 2010/0296693 | A1 | 11/2010 | Thornberry et al. |
| 2011/0033110 | A1 | 2/2011 | Shimamura et al. |
| 2011/0144954 | A1* | 6/2011 | Duncan .................. G06T 17/05 703/1 |
| 2012/0135745 | A1* | 5/2012 | Kaplan .................. G01C 21/32 455/456.1 |
| 2013/0086109 | A1* | 4/2013 | Huang ............... G06F 17/30412 707/770 |
| 2013/0246204 | A1 | 9/2013 | Thornberry et al. |

FOREIGN PATENT DOCUMENTS

| | | |
|---|---|---|
| CA | 2402234 | 9/2000 |
| CA | 2505566 | 5/2004 |
| CN | 1735897 A | 2/2006 |
| DE | 60017384 T | 3/2006 |
| DE | 60306301 T | 11/2006 |
| DK | 1418402 T | 10/2006 |
| EP | 1010966 | 2/1999 |
| EP | 1180967 | 2/2002 |
| EP | 1418402 | 5/2004 |
| EP | 1696204 | 8/2006 |
| ES | 2266704 T | 3/2007 |
| JP | 2003/317089 A | 11/2003 |
| JP | 2007-052809 A | 3/2007 |
| KR | 10-0725727 A1 | 6/2007 |
| KR | 10-2012-01309047 A | 12/2012 |
| MX | PA05004987 | 2/2006 |
| WO | WO99/18732 | 4/1999 |
| WO | WO/00/53090 | 9/2000 |
| WO | WO/2004/044692 | 5/2004 |
| WO | WO/2005/088251 | 9/2005 |
| WO | WO/2008/028040 | 3/2008 |
| WO | WO2008-152740 A1 | 12/2008 |

OTHER PUBLICATIONS

Ciampa, John A., "Pictometry Digital Video Mapping", SPIE, vol. 2598, pp. 140-148, 1995.

Ciampa, J. A., Oversee, Presented at Reconstruction After Urban earthquakes, Buffalo, NY, 1989.

Dunford et al., Remote Sensing for Rural Development Planning in Africa, The Journal for the International Institute for Aerial Survey and Earth Sciences, 2:99-108, 1983.

Gagnon, P.A., Agnard, J. P., Nolette, C., & Boulianne, M., "A Micro-Computer based General Photogrammetric System", Photogrammetric Engineering and Remote Sensing, vol. 56, No. 5., pp. 623-625, 1990.

Konecny, G., "Issues of Digital Mapping", Leibniz University Hannover, Germany, GIS Ostrava 2008, Ostrava 27.—Jan. 30, 2008, pp. 1-8.

Konecny, G., "Analytical Aerial Triangulation with Convergent Photography", Department of Surveying Engineering, University of New Brunswick, pp. 37-57, 1966.

Konecny, G., "Interior Orientation and Convergent Photography", Photogrammetric Engineering, pp. 625-634, 1965.

Graham, Lee A., "Airborne Video for Near-Real-Time Vegetation Mapping", Journal of Forestry, 8:28-32, 1993.

Graham, Horita TRG-50 SMPTE Time-Code Reader, Generator, Window Inserter, 1990.

Hess, L.L, et al., "Geocoded Digital Videography for Validation of Land Cover Mapping in the Amazon Basin", International Journal of Remote Sensing, vol. 23, No. 7, pp. 1527-1555, 2002.

Hinthorne, J., et al., "Image Processing in the Grass GIS", Geoscience and Remote Sensing Symposium, 4:2227-2229, 1991.

Imhof, Ralph K., "Mapping from Oblique Photographs", Manual of Photogrammetry, Chapter 18, 1966.

Jensen, John R., Introductory Digital Image Processing: A Remote Sensing Perspective, Prentice-Hall, 1986; 399 pages.

Lapine, Lewis A., "Practical Photogrammetric Control by Kinematic GPS", GPS World, 1(3):44-49, 1990.

Lapine, Lewis A., Airborne Kinematic GPS Positioning for Photogrammetry—The Determination of the Camera Exposure Station, Silver Spring, MD, 11 pages, at least as early as 2000.

Linden et al., Airborne Video Automated Processing, US Forest Service Internal report, Fort Collins, CO, 1993.

Myhre, Dick, "Airborne Video System Users Guide", USDA Forest Service, Forest Pest Management Applications Group, published by Management Assistance Corporation of America, 6 pages, 1992.

Myhre et al., "An Airborne Video System Developed Within Forest Pest Management—Status and Activities", 10 pages, 1992.

Myhre et al., "Airborne Videography—A Potential Tool for Resource Managers"—Proceedings: Resource Technology 90, 2nd International Symposium on Advanced Technology in Natural Resource Management, 5 pages, 1990.

Myhre et al., Aerial Photography for Forest Pest Management, Proceedings of Second Forest Service Remote Sensing Applications Conference, Slidell, Louisiana, 153-162, 1988.

Myhre et al., "Airborne Video Technology", Forest Pest Management/Methods Application Group, Fort Collins, CO, pp. 1-6, at least as early as Jul. 30, 2006.

Norton-Griffiths et al., 1982. "Sample surveys from light aircraft combining visual observations and very large scale color photography". University of Arizona Remote Sensing Newsletter 82-2:1-4.

Norton-Griffiths et al., "Aerial Point Sampling for Land Use Surveys", Journal of Biogeography, 15:149-156, 1988.

Novak, Rectification of Digital Imagery, Photogrammetric Engineering and Remote Sensing, 339-344, 1992.

Slaymaker, Dana M., "Point Sampling Surveys with GPS-logged Aerial Videography", Gap Bulletin No. 5, University of Idaho, http://www.gap.uidaho.edu/Bullentins/5/PSSwGPS.html, 1996.

Slaymaker, et al., "Madagascar Protected Areas Mapped with GPS-logged Aerial Video and 35mm Air Photos", Earth Observation magazine, vol. 9, No. 1, http://www.eomonline.com/Common/Archives/2000jan/00jan_tableofcontents.html, pp. 1-4, 2000.

Slaymaker, et al., "Cost-effective Determination of Biomass from Aerial Images", Lecture Notes in Computer Science, 1737:67-76, http://portal.acm.org/citation.cfm?id=648004.743267&coll=GUIDE&dl=, 1999.

Slaymaker, et al., "A System for Real-time Generation of Geo-referenced Terrain Models", 4232A-08, *SPIE Enabling Technologies for Law Enforcement* Boston, MA, ftp://vis-ftp.cs.umass.edu/Papers/schultz/spie2000.pdf, 2000.

Slaymaker, et al.,"Integrating Small Format Aerial Photography, Videography, and a Laser Profiler for Environmental Monitoring", In ISPRS WG III/1 Workshop on Integrated Sensor Calibration and Orientation, Portland, Maine, 1999.

Slaymaker, et al., "Calculating Forest Biomass With Small Format Aerial Photography, Videography and a Profiling Laser", In Proceedings of the 17th Biennial Workshop on Color Photography and Videography in Resource Assessment, Reno, NV, 1999.

Slaymaker et al., Mapping Deciduous Forests in Southern New England using Aerial Videography and Hyperclustered Multi-Temporal Landsat TM Imagery, Department of Forestry and Wildlife Management, University of Massachusetts, 1996.

Star et al., "Geographic Information Systems an Introduction", Prentice-Hall, 1990.

Tomasi et al., "Shape and Motion from Image Streams: a Factorization Method"—Full Report on the Orthographic Case, pp. 9795-9802, 1992.

Warren, Fire Mapping with the Fire Mousetrap, Aviation and Fire Management, Advanced Electronics System Development Group, USDA Forest Service, 1986.

(56) References Cited

OTHER PUBLICATIONS

Welch, R., "Desktop Mapping with Personal Computers", Photogrammetric Engineering and Remote Sensing, 1651-1662, 1989.

Westervelt, James, "Introduction to GRASS 4", pp. 1-25, 1991.

"RGB Spectrum Videographics Report, vol. 4, No. 1, McDonnell Douglas Integrates RGB Spectrum Systems in Helicopter Simulators", pp. 1-6, 1995.

RGB "Computer Wall", RGB Spectrum, 4 pages, 1995.

"The First Scan Converter with Digital Video Output", Introducing . . . The RGB/Videolink 1700D-1, RGB Spectrum, 2 pages, 1995.

ERDAS Field Guide, Version 7.4, A Manual for a commercial image processing system, 1990.

"Image Measurement and Aerial Photography", Magazine for all branches of Photogrammetry and its fringe areas, Organ of the German Photogrammetry Association, Berlin-Wilmersdorf, No. 1, 1958.

"Airvideo Analysis", Microimages, Inc., Lincoln, NE, 1 page, Dec. 1992.

Zhu, Zhigang, Hanson, Allen R., "Mosaic-Based 3D Scene Representation and Rendering", Image Processing, 2005, ICIP 2005, IEEE International Conference on 1(2005).

Mostafa, et al., "Direct Positioning and Orientation Systems How do they Work? What is the Attainable Accuracy?", Proceeding, American Society of Photogrammetry and Remote Sensing Annual Meeting, St. Louis, MO, Apr. 24-27, 2001.

Mostafa, et al., "Ground Accuracy from Directly Georeferenced Imagery", Published in GIM International vol. 14 N. 12 Dec. 2000.

Mostafa, et al., "Airborne Direct Georeferencing of Frame Imagery: An Error Budget", The 3$^{rd}$ International Symposium on Mobile Mapping Technology, Cairo, Egypt, Jan. 3-5, 2001.

Mostafa, M.R. and Hutton, J., "Airborne Kinematic Positioning and Attitude Determination Without Base Stations", Proceedings, International Symposium on Kinematic Systems in Geodesy, Geomatics, and Navigation (KIS 2001) Banff, Alberta, Canada, Jun. 4-8, 2001.

Mostafa, et al., "Airborne DGPS Without Dedicated Base Stations for Mapping Applications", Proceedings of ION-GPS 2001, Salt Lake City, Utah, USA, Sep. 11-14.

Mostafa, "ISAT Direct Exterior Orientation QA/QC Strategy Using POS Data", Proceedings of OEEPE Workshop: Integrated Sensor Orientation, Hanover, Germany, Sep. 17-18, 2001.

Mostafa, "Camera/IMU Boresight Calibration: New Advances and Performance Analysis", Proceedings of the ASPRS Annual Meeting, Washington, D.C., Apr. 21-26, 2002.

Hiatt, "Sensor Integration Aids Mapping at Ground Zero", Photogrammetric Engineering and Remote Sensing, Sep. 2002, p. 877-878.

Mostafa, "Precision Aircraft GPS Positioning Using CORS", Photogrammetric Engineering and Remote Sensing, Nov. 2002, p. 1125-1126.

Mostafa, et al., System Performance Analysis of INS/DGPS Integrated System for Mobile Mapping System (MMS), Department of Geomatics Engineering, University of Calgary, Commission VI, WG VI/4, Mar. 2004.

Artes F., & Hutton, J., "GPS and Inertial Navigation Delivering", Sep. 2005, GEOconnexion International Magazine, p. 52-53, Sep. 2005.

"POS AV" APPLANIX, Product Outline, airborne@applanix.com, 3 pages, Mar. 28, 2007.

POSTrack, "Factsheet", APPLANIX, Ontario, Canada, www.applanix.com, Mar. 2007.

POS AV "Digital Frame Camera Applications", 3001 Inc., Brochure, 2007.

POS AV "Digital Scanner Applications", Earthdata Brochure, Mar. 2007.

POS AV "Film Camera Applications" AeroMap Brochure, Mar. 2007.

POS AV "LIDAR Applications" MD Atlantic Brochure, Mar. 2007.

POS AV "OEM System Specifications", 2005.

POS AV "Synthetic Aperture Radar Applications", Overview, Orbisat Brochure, Mar. 2007.

"POSTrack V5 Specifications" 2005.

"Remote Sensing for Resource Inventory Planning and Monitoring", Proceeding of the Second Forest Service Remote Sensing Applications Conference—Slidell, Louisiana and NSTL, Mississippi, Apr. 11-15, 1988.

"Protecting Natural Resources with Remote Sensing", Proceeding of the Third Forest Service Remote Sensing Applications Conference—Apr. 9-13, 1990.

Heipke, et al, "Test Goals and Test Set Up for the OEEPE Test—Integrated Sensor Orientation", 1999.

Kumar, et al., "Registration of Video to Georeferenced Imagery", Sarnoff Corporation, CN5300, Princeton, NJ, 1998.

McConnel, Proceedings Aerial Pest Detection and Monitoring Workshop—1994.pdf, USDA Forest Service Forest Pest Management, Northern Region, Intermountain region, Forest Insects and Diseases, Pacific Northwest Region.

"Standards for Digital Orthophotos", National Mapping Program Technical Instructions, US Department of the Interior, Dec. 1996.

Tao, "Mobile Mapping Technology for Road Network Data Acquisition", Journal of Geospatial Engineering, vol. 2, No. 2, pp. 1-13, 2000.

"Mobile Mapping Systems Lesson 4", Lesson 4 SURE 382 Geographic Information Systems II, pp. 1-29, Jul. 2, 2006.

Konecny, G., "Mechanische Radialtriangulation mit Konvergentaufnahmen", Bildmessung und Luftbildwesen, 1958, Nr. 1.

Myhre, "ASPRS/ACSM/RT 92" Technical papers, Washington, D.C., vol. 5 Resource Technology 92, Aug. 3-8, 1992.

Rattigan, "Towns get new view from above," *The Boston Globe*, Sep. 5, 2002.

Mostafa, et al., "Digital image georeferencing from a multiple camera system by GPS/INS," *ISP RS Journal of Photogrammetry & Remote Sensing*, 56(I): 1-12, Jun. 2001.

Dillow, "Grin, or bare it, for aerial shot," *Orange County Register* (California), Feb. 25, 2001.

Anonymous, "Live automatic coordinates for aerial images," *Advanced Imaging*, 12(6):51, Jun. 1997.

Anonymous, "Pictometry and US Geological Survey announce—Cooperative Research and Development Agreement," Press Release published Oct. 20, 1999.

Miller, "Digital software gives small Arlington the Big Picture," *Government Computer NewsState & Local*, 7(12), Dec. 2001.

Garrett, "Pictometry: Aerial photography on steroids," *Law Enforcement Technology* 29(7):114-116, Jul. 2002.

Weaver, "County gets an eyeful," *The Post-Standard* (Syracuse, NY), May 18, 2002.

Reed, "Firm gets latitude to map O.C. in 3D," *Orange County Register* (California), Sep. 27, 2000.

Reyes, "Orange County freezes ambitious aerial photography project," *Los Angeles Times*, Oct. 16, 2000.

Aerowest Pricelist of Geodata as of Oct. 21, 2005 and translations to English 3 pages.

www.archive.org Web site showing archive of German AeroDach Web Site http://www.aerodach.de from Jun. 13, 2004 (retrieved Sep. 20, 2012) and translations to English 4 pages.

AeroDach® Online Roof Evaluation Standard Delivery Format and 3D Data File: Document Version 01.00.2002 with publication in 2002, 13 pages.

Noronha et al., "Detection and Modeling of Building from Multiple Aerial Images," Institute for Robotics and Intelligent Systems, University of Southern California, Nov. 27, 2001, 32 pages.

Applicad Reports dated Nov. 25, 1999-Mar. 9, 2005, 50 pages.

Applicad Online Product Bulletin archive from Jan. 7, 2003, 4 pages.

Applicad Sorcerer Guide, Version 3, Sep. 8, 1999, 142 pages.

Xactimate Claims Estimating Software archive from Feb. 12, 2010, 8 pages.

(56) References Cited

OTHER PUBLICATIONS

Bignone et al, Automatic Extraction of Generic House Roofs from High Resolution Aerial Imagery, Communication Technology Laboratory, Swiss Federal Institute of Technology ETH, CH-8092 Zurich, Switzerland, 12 pages, 1996.

Geospan 2007 Job proposal.

Greening et al., Commercial Applications of GPS-Assisted Photogrammetry, Presented at GIS/LIS Annual Conference and Exposition, Phoenix, AZ, Oct. 1994.

International Search Report and Written Opinion re PCT/US2014/024685, Mail Date Dec. 22, 2014, from the International Searching Authority (KIPO).

* cited by examiner

SYSTEM AND METHOD FOR EARLY ACCESS TO CAPTURED IMAGES

FIELD OF THE DISCLOSURE

The disclosure generally relates to methods and systems for early access to captured images that typically require lengthy processing times. More particularly the disclosure relates, but is not limited, to methodologies for early access to captured images through a geospatial database during multiple steps of a post-capture processing stage which steps are used to enhance the quality and accuracy of the captured images, but prior to the captured images being fully processed and loaded into the geospatial database.

BACKGROUND

In the remote sensing/aerial imaging industry, imagery may be used to capture views of a geographic area in order to identify and measure objects and/or structures within the images as well as to be able to determine geographic locations of points within the image. These are generally referred to as "geo-referenced images" and come in two basic categories:

Vertical Imagery, also known as Nadir Imagery—images captured with a camera pointed vertically downward thus generally capturing the tops of structures; and, Oblique Imagery—images captured with a camera aimed at an angle capturing the sides, as well as, tops of structures.

One of the uses for vertical imagery and oblique imagery is in the assessment of properties for tax purposes by tax assessors. In particular, counties have been requesting aerial image providers to fly the counties to obtain aerial images for assessment purposes for years. For example, Pictometry International Corp., the assignee of the present patent application, is an aerial image provider that flies the entire county, and then creates a County Image Warehouse, which is a geospatial image database containing the complete set of oblique images for that county. The county assessor would then use this image warehouse to select comparable properties and other tasks that are part of their mass appraisal effort to establish the property tax base for the town, county, or tax appraisal district.

In many cases, government regulations dictate that the images must be captured close to the start of the calendar year and that the entire assessment process must be completed by mid-Spring. Traditionally, an airplane or a drone carries one or more cameras to fly geographic areas, such as a county or city to capture vertical imagery and oblique imagery of the geographic areas. Many images can be captured during each flight resulting in very large oblique image libraries of captured images. After the images are captured during the various flight sorties, an initial process is used to determine the actual geographic boundary of the area shown in the images. Thereafter, the images are processed through multiple steps in a post-capture processing stage to color-balance the images as well as to more accurately geo-reference the images. Thereafter, the color-balanced and geo-referenced images may be quality-control checked, and then assembled into the County Image Warehouse.

Once all the flights are complete and all of the portions of the County Image Warehouse are assembled, the completed County Image warehouse is then loaded into a geospatial database of oblique imagery allowing the newly captured images to be accessed and viewed along with the older captured images as part of an online service, such as Pictometry Online.

Pictometry Online is an online service hosted by a computer system that has a geospatial database currently containing a massive inventory of oblique and vertical imagery captured by Pictometry's Capture System. The geospatial database currently contains more than 170,000,000 images and is growing significantly each year. Once the captured images are loaded into the geospatial database, the online service allows a customer to simply navigate to an area using a query and the online service retrieves an oblique image that best represents the area of interest and then displays that oblique image in a manner that allows the user to both visualize the area of interest and to measure and extract other information contained within the image. The online service also allows the user to continuously pan through the massive database of oblique images, seamlessly moving from one image to the next. Because of this capability and because the online method of delivery reduces the information technology burden to support the County Image Warehouse, many customers are now switching over to the online delivery mechanism.

The methods discussed above for capturing images, processing images and loading images into the geospatial database have been in practice for years to permit the geospatial databases to deliver the newly captured images to particular customers. Initially, the geospatial databases were delivered on a hard drive, while more recently the delivery has been made online using an online service.

In a standard geospatial database deployment, images are "ingested" into the database and their geospatial indices are calculated to enable fast searching based on geospatial coordinates. Typically, the geospatial metadata and the image pixel data for each captured image are stored in separate database tables or areas. This is done since typically the type of access to the metadata and the image pixel data are different and thus for optimization purposes the metadata and image pixel data are stored differently. The separate database tables or areas may be a part of a relational database.

In any event, as the size of the geospatial databases increase, these ingestion steps take increasing amounts of time to complete because the regeneration and optimization of the geospatial indices becomes a more time consuming task as the number of records continues to grow. As such, common practice is to complete the processing of an "image library" (an arbitrary collection of imagery, typically of a given geospatial area) and then ingest the library into the geospatial database at the same time since it becomes time and processing prohibitive to ingest individual groups of images as they come in.

The result of this standard practice is that there is an access delay present for new collections of imagery before they are included in a massive image geospatial database. This prevents customers from being able to access imagery while it is still in the processing stage. Alternatively, the new collections of imagery can be ingested into the geospatial database, but then any subsequent improvements to the image quality or image accuracy are not available unless the new collections of imagery have been re-ingested into the geospatial database. This heavy burden, both administratively and from a resource consumption standpoint, might be possible for special projects, such as post-disaster flights, but it is not repeatable on a routine basis when operating a large fleet of aircraft that are generating thousands of new projects each capture season.

The conventional method discussed above results in a one to three month delay between when the images are captured, to when the images are available to be accessed by the customer. During this time period, the captured images are going through multiple discrete steps of the processing stage in which the image quality and/or the image accuracy is being enhanced. Exemplary steps of the processing stage include color-balancing, geo-referencing, quality control checks, and assembling the captured images into image warehouses. Since the images are required to be captured close to the start of the calendar year and the entire assessment process must be completed by mid-Spring, the assessors must appraise the properties within the entire territory in a very short amount of time. In many cases, this dictates that the county must hire or maintain a larger staff than would otherwise be needed in order to process this large number of properties in a short amount of time.

As prudent managers of taxpayer funds, the counties are interested in ways to reduce the impact of the conventional methodology by increasing the amount of time that their assessors have to appraise the properties in their territory. The present disclosure is directed to a new and improved computerized methodology that is designed to provide access to the captured images in a much shorter period of time than the conventional process.

SUMMARY

Methods and systems for addressing the problems discussed above are disclosed. The problem of enhanced staffing by the counties is addressed by early access methodologies that provide access to the captured images through the geospatial database during multiple steps of the post-capture processing stage used to enhance the quality and accuracy of the captured images, but prior to the captured images being fully processed and loaded into the geospatial database. Thus, counties are able to access the captured images through the geospatial database between one to three months earlier than the prior methodology resulting in more time for the assessors to be able to appraise the parcels.

Early access to the captured images can be implemented by storing the captured images and metadata for the captured images into one or more processing directories on one or more processing drives, and then generating and storing placeholder records within the geospatial database prior to completing the processing stage for enhancing the quality and/or accuracy of the captured images. The metadata may include geo-referencing information indicative of a position, orientation and characteristics of the camera used to capture the image that can be used to derive real-world geographic coordinates of the area and structures depicted within the image. Techniques for obtaining and using the position, orientation and characteristics of the camera to derive real-world coordinates of the area and structure depicted within the image are discussed in U.S. Pat. No. 7,424,133 which is hereby incorporated herein by reference.

The placeholder records can be generated and stored prior to the beginning of the post-capture processing stage. Each of the placeholder records are for a particular captured image and include a geographic image boundary field populated with information indicative of the geographic footprint of the captured image so that the captured image can be located during a request for captured images of a particular geographic location or region sent to the one or more servers by a client application running on an operator user device.

The placeholder records also include an image file location field, and an image status field for the particular captured image. The image file location field for each captured image may identify logic for retrieving the captured image and/or its metadata which may include the geo-referencing information associated with the captured image by the one or more servers from a project directory that is separate from the geospatial database, but accessible by the one or more server. The project directory is also accessible by one or more processing computer that is being used to implement a step of the post-capture processing stage. The image status field may store information indicative of the captured image being in the post-capture processing stage, or the state or status of the captured image within the post-capture processing stage. For example, the image status field may store information indicating that geo-referencing has been completed, but quality control has not been completed.

Because the placeholder record for the captured image has the general geospatial bounds of the image footprint for the image, the placeholder record can be located during a search for a particular geographic location or region from the customer's computer. The one or more server may execute computer executable code that causes the one or more server to access and read the image status field of the placeholder record within the image geospatial database to determine whether the captured image is fully processed, and if not, the one or more server uses the image file location field to locate the image and/or metadata on the processing drive(s) and retrieves the image and/or full metadata from the processing drive(s) rather than from the geospatial database.

As the captured images are processed during steps of the post-capture processing stage, updates to the captured images and/or the metadata are stored in the processing directories of the processing drive(s), rather than in the geospatial database. When the post-capture processing stage of a library of captured images has been completed including all quality control checks, the captured images and associated metadata from the library can then be fully ingested into the geospatial database. Because the images in the library that have completed the post-capture processing stage have the metadata indices of their placeholder records, the captured images and their associated metadata are loaded into the placeholder records to convert the placeholder records into permanent records. Further, the image status field is updated to reflect that the post-capture processing stage is complete. Thereafter, the geospatial indices update can be run on the geospatial database once ingestion is complete and all of the placeholder records for images in the library have been converted into permanent records.

Thereafter, the images (including the finished metadata and pixel content) will be retrieved directly from the repositories within the geospatial database. In other words, if the image status field indicates that the captured image has been fully processed and the placeholder record has been converted into a permanent record for the image, then the metadata will be accessed and retrieved from the permanent record for the captured image as would normally be the case.

The early access methodology described within the present disclosure may not be as efficient as the conventional methodology which retrieves the metadata from the geospatial database; however customers are willing to endure this slight additional time delay in order to be able to get early access to the imagery. Similarly, when a client requests to view the image the server software interprets the status field and uses the "image file location field" in order to locate the image pixel data and sends that data to the client application on the operator user device rather than retrieving the image pixel data from the geospatial database image repository.

Because the one or more server accesses the captured image and its metadata from the processing drive(s) during the post-capture processing stage, improvements in the captured image and/or its metadata due to completed processing steps are reflected in the image and/or metadata delivered to the client application even though the captured image and/or its metadata has not been ingested into the geospatial database.

As the image location or status of the captured images is changed during the steps of the post capture processing stage, updates are generated by one or more processing computer and transmitted to the one or more servers of a computer system hosting the geospatial database. Information indicative of the updates is received by the one or more servers and is used to populate at least one of the image file location field and the image status field of the placeholder records within the geospatial database.

In one embodiment, the image location for each captured image may identify logic for retrieving the captured image and/or its metadata including geo-referencing information associated with the captured image by the one or more servers from a project directory that is separate from the geospatial database. The project directory may also be accessible by the one or more processing computer that is being used to implement a step of the processing methodology.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
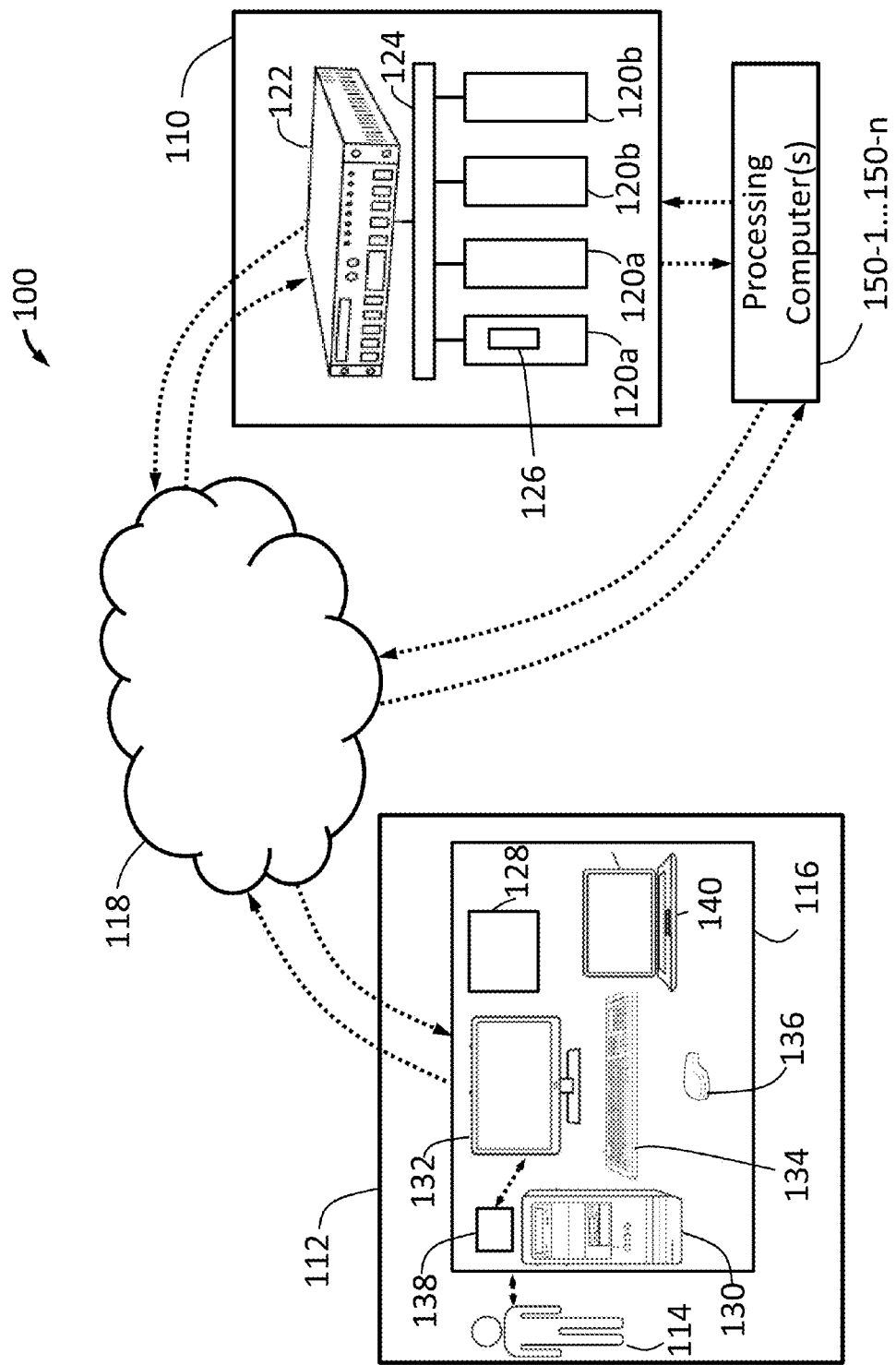
FIG. 1 is a block diagram of an exemplary computer system constructed in accordance with the present disclosure.

The following detailed description refers to the accompanying drawings. The same reference numbers in different drawings may identify the same or similar elements.

The mechanisms proposed in this disclosure circumvent the problems described above. The present disclosure describes a method and system for performing sensitive geospatial processing in non-sensitive operator environments.

In one embodiment, a computer system comprises one or more non-transitory computer readable mediums storing computer executable code that when executed by one or more servers of the computer system cause the one or more servers to generate and store a plurality of placeholder records for captured images within a geospatial database. The placeholder records may have information identifying a particular captured image, at least one geographic image boundary field containing information indicative of a real-world geographic area depicted within the image, an image file location field, and an image status field. The server may receive a plurality of signals from one or more processing computer, at least two of the signals having the information identifying particular captured images and indicative of updates indicating a change in at least one of the image location and image processing status for the image. The server may populate at least one of the image file location field and the image status field of the placeholder records within the geospatial database with the information indicative of updates for identified captured images.

Additionally, the placeholder records may have or be linked to at least one metadata field adapted to store geolocation information for a captured image, and at least one image raster data field adapted to store at least a portion of the captured image, and the one or more servers may populate the at least one metadata field and the at least one image raster data field after processing steps have been completed for the captured images, for example, after at least two processing steps.

In one embodiment, the one or more server may receive a request for at least one image of a geographic area from a client application of an operator user device; query records within a geospatial database to locate one or more records of images accessible by the geospatial database and depicting at least a portion of the geographic area; for at least one record located in the query, read a first field within the record indicating a status of the image; and read a second field within the record responsive to the status of the image indicating that the image is not stored in the geospatial database, the second field having information indicative of a location of the image in a non-transient memory; and present the image to the client application of the operator user device utilizing the information of the second field to identify the location of the image in the non-transient memory.

In one embodiment, the server may present at least a portion of the image to the client application of the operator user device with a status indicator indicating a post-capture processing status of the image.

Description

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Software includes one or more computer executable instructions that when executed by one or more component cause the component to perform a specified function. It should be understood that the algorithms described herein are stored on one or more non-transient memory. Exemplary non-transient memory includes random access memory, read only memory, flash memory or the like. Such non-transient memory can be electrically based or optically based.

Referring now to the drawings, and in particular to FIG. 1, shown therein and designated by a reference numeral 100 is an exemplary computer system constructed in accordance with the present disclosure. The computer system 100 can be a system or systems that are able to embody and/or execute the logic of the processes described herein. The logic embodied in the form of software instructions or firmware may be executed on any appropriate hardware which may be a dedicated system or systems, or a personal computer system, or distributed processing computer system. In particular, the logic can be implemented in a stand-alone environment operating on a single computer system, or the logic can be implemented in a networked environment such as a distributed system using multiple computers and/or processors.

For example, the computer system 100 may be distributed, and may include a controlled datacenter 110 acting as a host system, communicating with one or more Customer Entity 112 and/or Customer Operator 114 utilizing one or more operator user device(s) 116 via a network 118. The network 118 can be the Internet or other network. The controlled datacenter 110 may include one or more servers 120 (which will be referred to hereinafter as the server 120) configured to communicate with the network 118 via one or more gateways 122. If the network 118 is the Internet, then the client application forming the primary user interface of the computer system 100 for operator user devices 116 may be a browser receiving content through a series of web pages. The client application forming the primary user interface may be another type of interface, such as a Windows-based application. This method may also be used when deploying the computer system 100 in a stand-alone environment.

The network 118 can be almost any type of network such as Internet and Internet 2 networks. If the network 118 exists in an Internet environment, network 118 may be TCP/IP-based. It is conceivable that in the near future, more advanced networking topologies may be used.

The server 120 can be networked with a LAN 124. The gateway 122 is an entity responsible for providing access between the LAN 124 and the network 118. The gateway 122 can also be used as a security means to protect the LAN 124 from attack through external networks such as the network 118. The LAN 124 and the one or more servers 120 may be secured from unauthorized access physically and/or logically.

The LAN 124 network can be based on a TCP/IP network such as the Internet, or it can be based on another underlying network transport technology. The preferred embodiment uses an Ethernet network with TCP/IP because of the availability and acceptance of underlying technologies, but other embodiments may use other types of networks such as Fibre Channel, SCSI, Gigabit Ethernet, etc.

As discussed above, in one embodiment, the controlled datacenter 110 includes the one or more servers 120 (which will be referred to hereinafter as the server 120). The configuration of the server hardware will depend greatly upon the requirements and needs of the particular embodiment of the computer system 100. The servers 120 include one or more server processors 126 (which will be referred to hereinafter as the server processor 126). Typical embodiments will include multiple servers 120 with load balancing to increase stability and availability. It is envisioned that the servers 120 will include database servers 120a and application/web servers 120b. The database servers 120a may be separated from the application/web servers 120b to improve availability and also to provide the database servers 120a with improved hardware and storage and/or security. Of course, the controlled datacenter 110 may contain one or more other processors. Functions described herein as carried out by the server processor(s) 126 or operator user device(s) 116 may be carried out by one or more other processors in the controlled datacenter 110 or the computer system 100.

The operator user device 116 utilized by the Customer Entity/Operator 112/114 can be any number and type of devices. The operator user device 116 typically includes one or more user device processor 128 (which will be referred to hereinafter as the user device processor 128) running a client application, which may be a browser. The most typical scenario of the operator user device 116 involves the customer operator 114, using a computer 130 with a display 132, keyboard 134, and mouse 136. The operator user device 116 may include the user device processor 128. The display 132 can be a single monitor or multiple adjacent monitors. Typically, the operator user device 116 uses a type of software called a "browser" as indicated by a reference numeral 138 to render HTML/XHTML content that is generated when requesting resources from a source, such as the controlled datacenter 110. In one embodiment, the computer system 100 is designed to be compatible with major Web Browser vendors (e.g., Microsoft Internet Explorer, Google Chrome, Mozilla Firefox, and Opera). Other embodiments may wish to focus on one particular browser depending upon the common user base using the computer system 100.

The operator user device 116 can also be implemented as a portable device such as a laptop computer 140 (or handheld computer) or a pen-based or tablet computer. In one embodiment, the operator user device 116 can be a "dumb" device with the display 132 and keyboard 134 with at least a portion of computer processing taking place elsewhere. Current embodiments of computer system 100 can also be modified to use any of these or future developed devices.

One or more customer 112 may communicate with the controlled datacenter 110 directly and/or via the network 118. The one or more customer 112 may request and receive early access to images of geographic regions of interest.

The computer system 100 may also include one or more processing computer(s) 150-1 . . . 150-n. The processing computer(s) 150-1 . . . 150n may be internal and/or external to the controlled datacenter 110 and may contain one or more processors that are networked with the servers 120.

The computer system 100 is designed in this way as to provide flexibility in its deployment. Depending upon the requirements of the particular embodiment, the system logic could be designed to work in almost any environment such as a desktop application, a web application, or even simply as a series of web services.

The hardware and software of the computer system 100 may be designed for flexibility, scalability, and security. Although some specifics for software and hardware components may be mentioned herein, it will be understood that a wide array of different components could be substituted, such as using different database vendors or even replacing the databases with XML-based document stores.

When the computer system 100 is used to execute the logic of the processes described herein, such computer(s) and/or execution can be conducted at a same geographic location or multiple different geographic locations. Furthermore, the execution of the logic can be conducted continuously or at multiple discrete times.

In general, the computer system 100 is capable of displaying and processing geo-referenced imagery, such as aerial imagery, to measure within the imagery and/or identify objects within the imagery. The computer system 100 will be described by way of example utilizing aerial images shown on the display 132 of the computer 130. However, it should be understood that the computer system 100 can use other types of images, such as architectural images.

Figure 2:
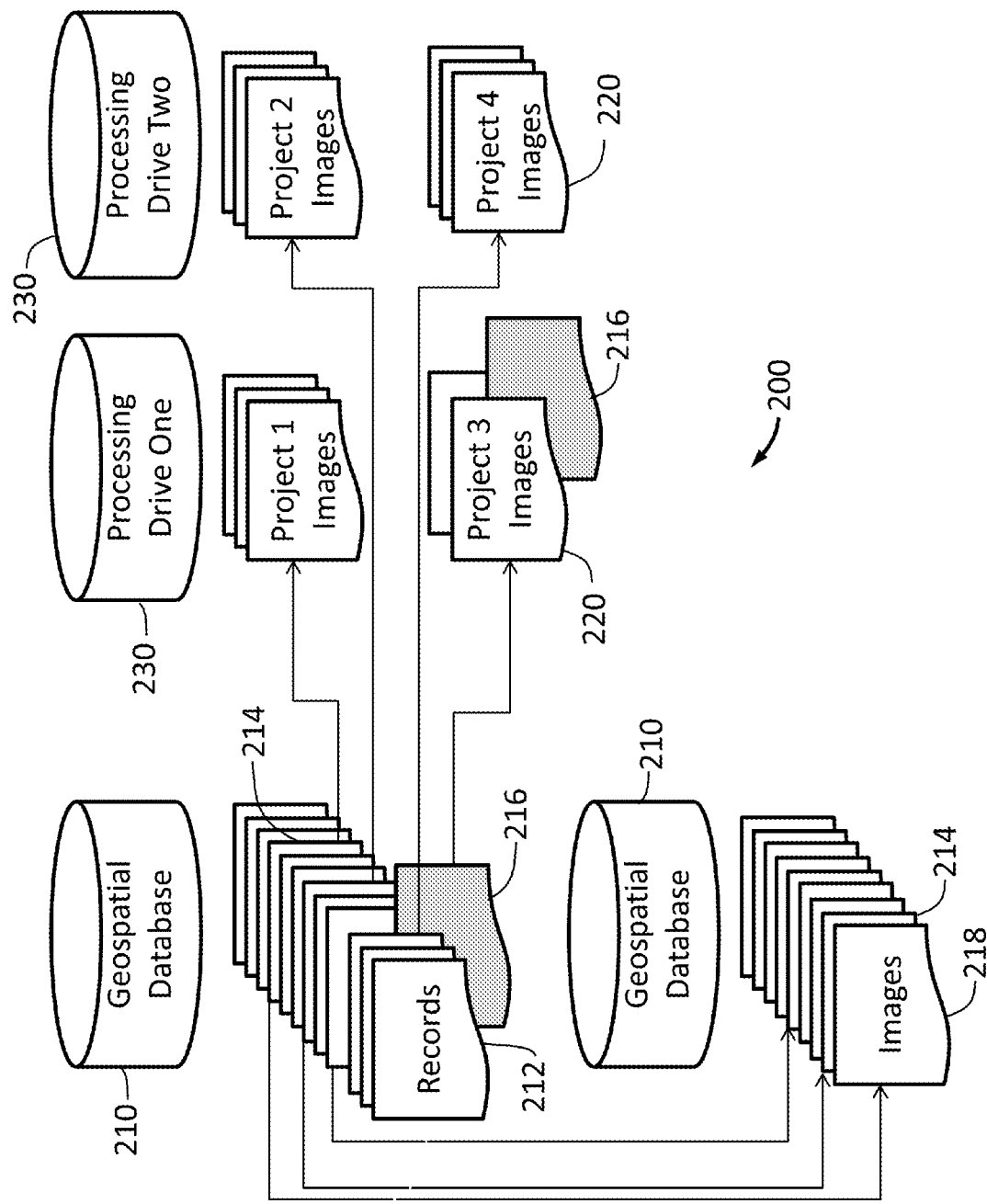
FIG. 2 is a block diagram of an exemplary storage system for storing a geospatial database having post-capture processed images, and images that are in a post capture processing stage on multiple processing drives in accordance with the present disclosure.

FIG. 2 is a block diagram of an exemplary storage system 200 for storing a geospatial database 210 having post-capture processed images, and images that are in a post-capture processing stage on multiple processing drives in accordance with the present disclosure. The one or more server 120a may store and access one or more geospatial database 210 in non-transitory memory. The geospatial database 210 may store records 212 indicative of captured images and metadata for the captured images. The records 212 may be permanent records 214 or placeholder records 216. In permanent records 214, associated processed captured images 218 and associated metadata have completed post-capture processing and may be used by the customer as a finished product for full analyses. The processed captured images 218 and associated metadata for the permanent record 214 are stored in the geospatial database 210.

Placeholder records 216 can be generated and stored prior to the beginning of the post-capture processing stage for the captured images. Each of the placeholder records 216 are for a particular in-process captured image 220. The placeholder record 216 includes a geographic image boundary field populated with geo-location information indicative of the geographic footprint of the in-process captured image 220. The geographic image boundary field allows the in-process captured image 220 to be located during a request for in-process captured images 220 of a particular geographic location or region sent to the one or more servers 120 by a client application running on an operator user device 116.

The records 212 also include an image file location field and an image status field for the particular in-process or processed captured image 218, 220. The image file location field for each in-process captured image 220 may identify logic for retrieving the in-process captured image or its metadata. The image file location field may include the location information associated with the in-process captured image 220 by the one or more server processors 126 to locate the storage location of the in-process captured image 220 and associated metadata. For example, the image file location field may include information indicative of a filename and project directory where the in-process captured image 220 and associated metadata are stored. The project directory may be a logical name associated with a particular physical drive or drives. The image status field may store information indicative of the processed captured image 218 being in the post-capture processing stage, or the state or status of the in-process captured image 220 within the post-capture processing stage. For example, the image status field may store information indicating that geo-referencing has been completed, but quality control has not been completed.

Of course, it should be understood that a plurality of fields may be associated with the records 212. Further, the information in the geographic image boundary field, the image file location field, and the image status field, may be stored in more than one field. In one example, the following fields and exemplary data are associated with an exemplary record 212:
Name: OKOKLA022013NeighObliq30E_060116
Capture Date: Jan. 16, 2006 13:14
GPS Time Code: 152055.953504
Shot Level: Neighborhood
Direction: East
Per Pixel Resolution: 0.51 (feet/pixel)
Image Size: 4008×2672
Upper Left Shot Corner Lat: 35.4723
Upper Left Shot Corner Lon: −97.5142
Upper Right Shot Corner Lat: 35.4719
Upper Right Shot Corner Lon: −97.4783
Lower Right Shot Corner Lat: 35.4785
Lower Right Shot Corner Lon: −97.5233
Lower Left Shot Corner Lat: 35.4782
Lower Left Shot Corner Lon: −97.5244
Camera Location Lat: 35.4746
Camera Location Lon: −97.5349
Camera Altitude: 4322.49
Average Elevation: 1202.32
Camera Pitch: −0.54346
Camera Roll: 53.40959
Camera Azimuth: 177.42867
Focal Length: 84.932
Focal Plane Width: 36.072
Focal Plane Height: 24.048
Principal Point Offset X: 51.444
Principal Point Offset Y: 41.656
Radial Distortion Coefficient 1: −6.1122276e-010
Radial Distortion Coefficient 1: 8.6850581e-017
Radial Distortion Coefficient 1: 8.8033733e-033
Tessellated Ground plane rows: 14
Tessellated Ground plane columns: 21
Tessellated Ground plane edge ratio: 1.200000
Named Library: OKOKLA06
Camera Serial Number: 8479
Early Access Status: Stage 4
Early Access Path: \\Xorn5\Processing2\OKOKLA06\Sortie7\FlightPlan43\OKOKLA022013Neigh-Obliq30E_060116.psi In the preceding example, the geographic image boundary field is represented by multiple fields storing latitude and longitude data for the image (for example, "Upper Left Shot Corner Lat" and "Upper Left Shot Corner Lon"). The image file location field is represented by an "Early Access Path" field storing a computer file path location including a computer drive name, computer directory names, and file name. The image status field is represented by an "Early Access Status" field storing information indicative of which stage of processing the image has completed. It should be understood that these fields are merely exemplary and the information may be stored in more or fewer fields and may be named and/or formatted differently.

The in-process captured image 220 and associated metadata may be located in a project directory on a processing drive 230 that is separate from the geospatial database 210, but accessible by the one or more server processor 126. The processing drive 230 may be stored on the same server 120 or a different server 120 than the geospatial database 210. The project directory on the processing drive 230 is also accessible by one or more processing computer 150 that is being used to implement one or more steps of the post-capture processing stage.

The one or more processing computer 150 runs post-capture processing software to implement one or more steps of the post-capture processing stage. The post-capture processing software is configured to avoid moving or locking the imagery such that the imagery cannot be accessed. As such, when work is being done on a particular image, such work is done on a working copy and as soon as the work is complete, the working copy may overwrite the previous copy, thus making the working copy immediately available to the end user. When the placeholder record 216 for the image is added into the geospatial database 210 for early access, the resulting metadata record index may be stored with the image on the processing drive 230 such that any changes in status can be recorded in the geospatial database 210 allowing the server 120 to act accordingly. Since the metadata may not be modified in the geospatial database 210, there is no need for the time consuming and resource expensive regeneration of geospatial indices. A particular image's geospatial bounds contained in the geospatial database 210 may be slightly off so a selection along the edge of the image may not retrieve that particular record, but if adequate overlap is maintained when collecting the imagery, an adjacent image will be retrieved instead, still providing the client or operator with complete coverage of the area. The important feature is that when the image is retrieved by the geospatial database 210, the further processed and more accurate metadata is what is sent with the image pixel content to the operator user device 116 such that any measurements taken upon the image enjoy the greater accuracy that occurs as images progress through the post-capture processing chain.

In one embodiment, the in-process captured images 220 and associated metadata may be stored on a removable portable drive. For example, in the case of post-disaster response, images may be needed immediately and so may be accessed by the server processor 126 from the removable portable drive directly after a plane capturing the images lands, or even before the plane lands. In this case, the server 120 would form the placeholder records 216 in the geospatial database 210 for the image files, while the image files remain on the removable portable drive.

Because the placeholder record 216 for the in-process captured image 220 has the general geospatial bounds of the image footprint for the in-process captured image 220 (for example, in the geographic image boundary field), the placeholder record 216 can be located during a search for a particular geographic location or region from the customer's computer. The one or more server processor 126 may execute computer executable code that causes the one or more server processor 126 to access and read the image status field of the placeholder record 216 within the image geospatial database 210 to determine whether the captured image is a fully processed captured image 218 or an in-process captured image 220. If the image is an in-process captured image 220, then the one or more server 120 may use the image file location field to locate the in-process captured image 220 and/or the associated metadata on the processing drive(s) 230 and to retrieve the in-process captured image 220 and/or full associated metadata from the processing drive(s) 230 rather than from the geospatial database 210.

As the in-process captured images 220 are processed during steps of the post-capture processing stage, updates to the in-process captured images 220 and/or the associated metadata are stored in the processing directories of the processing drive(s) 230, rather than in the geospatial database 210. When the post-capture processing stage of a library of in-process captured images 220 has been completed including all quality control checks, the in-process captured images 220 and associated metadata from the library can then be fully ingested into the geospatial database 210 as processed captured images 218. Because the in-process captured images 220 in the library that have completed the post-capture processing stage have the metadata indices of their placeholder records 216, the in-process captured images 220 and associated metadata are loaded into the placeholder records 216 to convert the placeholder records 216 into permanent records 214. Further, the image status field may be updated to reflect that the post-capture processing stage is complete. Thereafter, the geospatial indices update can be run on the geospatial database 210 once ingestion is complete and the placeholder records 216 for processed captured images in the library have been converted into permanent records 214.

Thereafter, the processed captured images 218 (including the finished associated metadata and pixel content) will be retrieved directly from the repositories within the geospatial database 210. In other words, if the image status field indicates that the captured image 218 has been fully processed and the placeholder record 216 has been converted into a permanent record 214 for the image 218, then the metadata will be accessed and retrieved from the permanent record 214 for the processed captured image 218 as would normally be the case. That is, the early access is replaced by normal access of the processed captured images 218 in the system.

Figure 3:
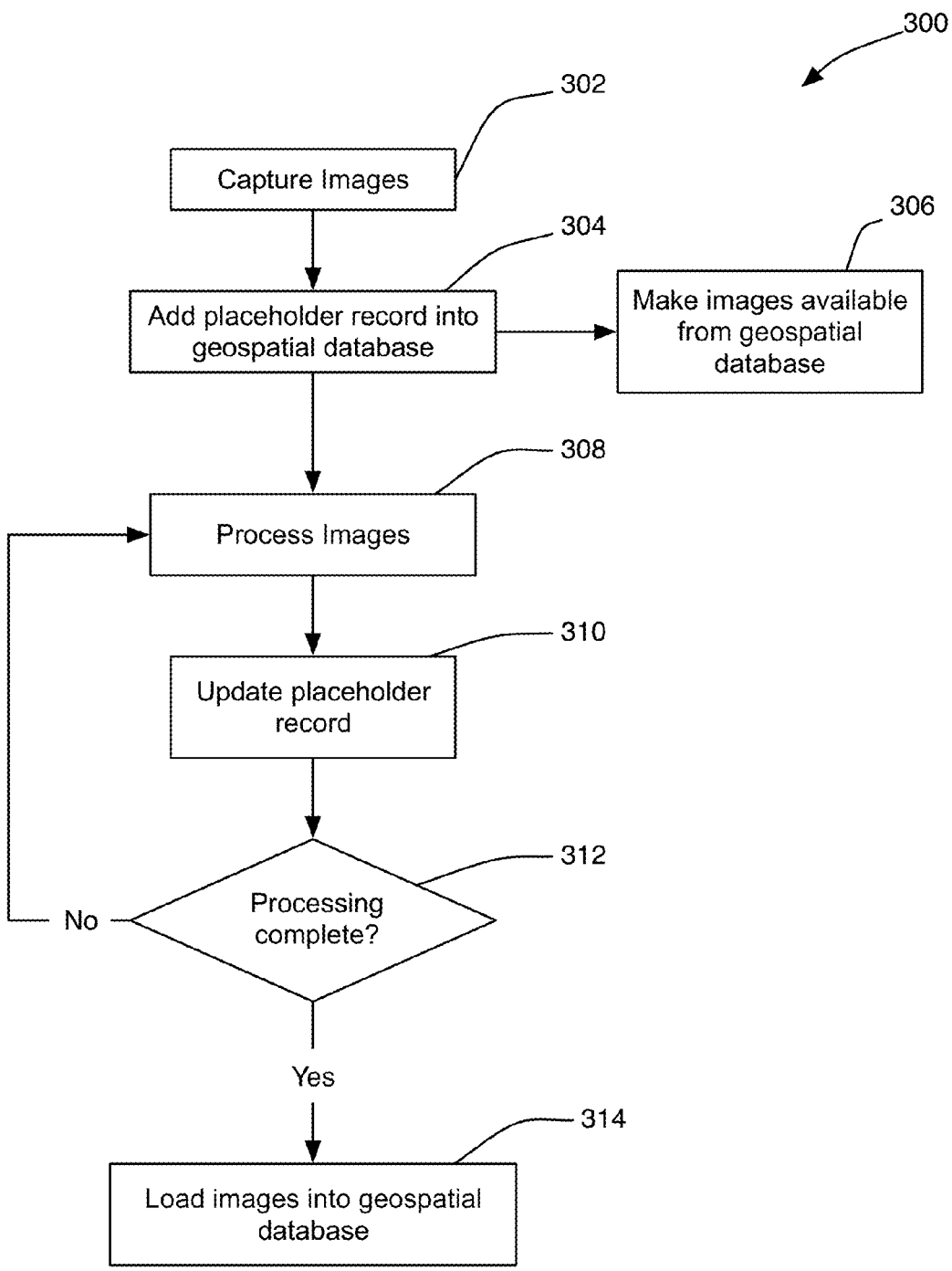
FIG. 3 is a flow diagram of a computerized process in which placeholder records are added to a geospatial database and updated as captured images are processed during multiple steps of a post capturing processing stage.

FIG. 3 is a flow diagram of a computerized process 300 in which placeholder records 216 are added to a geospatial database 210 and updated as in-process captured images 220 are processed during multiple steps of a post capture processing stage. The process 300 may begin with the capture of images, such as aerial images, in step 302. The server processor 126 may add placeholder records 216 into the geospatial database 210 for the in-process captured images 220 in step 304, while the in-process captured images are stored elsewhere, such as in processing drive(s) 230. The server processor 126, in step 306, may use the placeholder records 216 to make the in-process captured images 220 available to a user of the system. In step 308, the in-process captured images 220 are processed and then, after one or more processing steps, the placeholder record 216 may be updated, as shown in step 310. In one example, the placeholder record 216 may be updated after at least two processing steps. The placeholder record 216 may be updated with the status of the processing and/or the latest metadata for the in-process captured image 220.

Referring now to decision step 312, if the processing is incomplete, the process 300 may return to steps 308 and 310 to continue the processing of the in-process captured images 220 and continue updating the placeholder record 216. If the processing is complete, then the process 300 proceeds to step 314 in which the server processor 126 may load the now processed captured images 218 and the associated metadata into the geospatial database 210 and update the placeholder record 216 into a permanent record 214.

Figure 4:
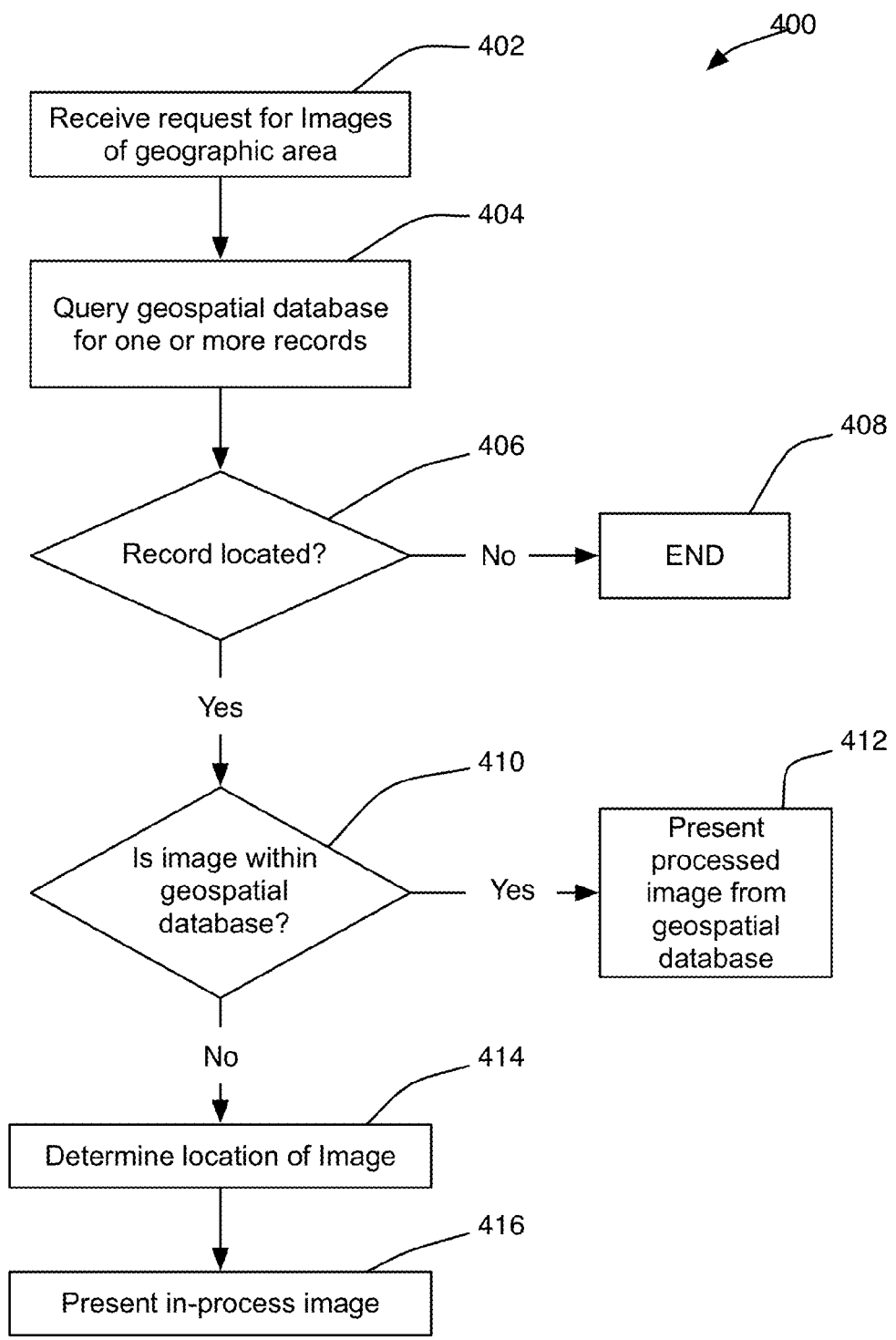
FIG. 4 is a flow diagram of a computerized process of an online service having servers hosting a geospatial database for presenting an image of a geographic area upon request for at least one image of the geographic area.
Figure 5:
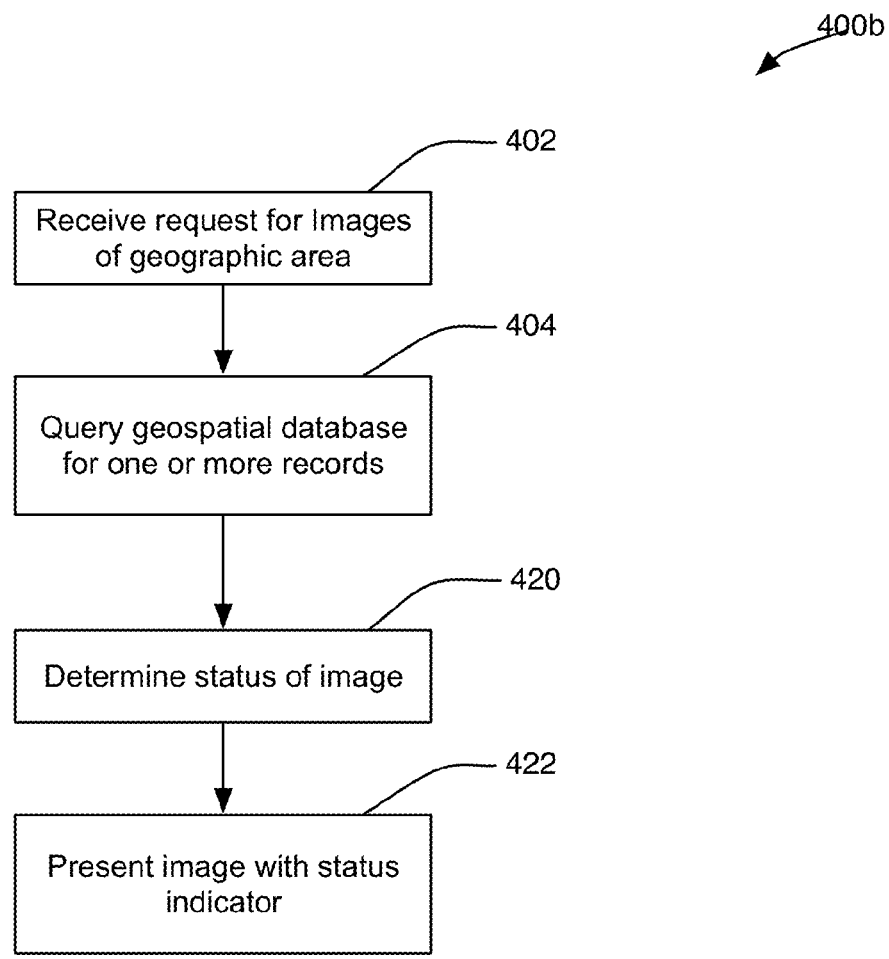
FIG. 5 is a flow diagram of a part of the computerized process of FIG. 4 in which a status indicator for the at least one image is presented along with a visual depiction of the image.

FIGS. 4 and 5 depict a process flow diagram of steps of an exemplary method 400 for receiving and processing requests for data processing of a geographic region of interest in accordance with the present disclosure. FIG. 4 is a flow diagram of a computerized process 400 of an online service having servers 120 hosting the geospatial database 210 for presenting an image of a geographic area upon request for at least one image of the geographic area. The server 120 may receive one or more request, for example, from customer entity 112, for one or more images of a geographic area, as illustrated in step 402. The request may indicate the geographic area by address, latitude and longitude, community, zip code, or other geographic or subject indicator. In step 404, the server processor 126 may query the geospatial database 210 for one or more record 212 that indicate, such as with information in the geographic image boundary field, that the corresponding image for the record depicts the geographic area of interest requested.

As illustrated in decision step 406, if one or more appropriate record 212 is not located by the server processor 126, then the process 400 ends in step 408. If one or more appropriate record 212 is located, then the process 400 moves to decision step 410. In decision step 410, the record 212 is queried to determine if the image corresponding to the record 212 is a processed captured image 218 stored within the geospatial database 210. If so, the process 400 moves to step 412 in which the server processor 126 presents the processed captured image 218 from the geospatial database 210 to the customer entity 112. If the image corresponding to the record 212 is not a processed captured image 218 stored within the geospatial database 210, but is rather an in-process captured image 220, then the server processor 126, in step 414, utilizes the image file location field in the placeholder record 216 to determine the storage location of the in-process captured image 220. Then, in step 416, the server processor 126 may present the in-process captured image 220 to the customer entity 112 from the determined location.

FIG. 5 is a flow diagram of a part 400b of the computerized process 400 of FIG. 4 in which a status indicator for the at least one image is presented along with a visual depiction of the image. As described in conjunction with FIG. 4, the server processor 126 may receive a request for one or more images of a geographic area (step 402) and query the geospatial database 210 for one or more images fulfilling the request (step 404). In the example of FIG. 5, the server processor 126 may also utilize the record 212 to determine the status of the image, as shown in step 420. For example, the server processor 126 may utilize information in the image status field, as previously described. The server processor 126 may present the image to the customer entity 112 along with a status indicator, as shown in step 422. For example, the indicator may show that the image is not fully processed, or may indicate the current stage in the processing steps of the image. In one example, the indicator may be a "badge" overlaid with the image, for example, across one or more corners of the image.

Figure 6:
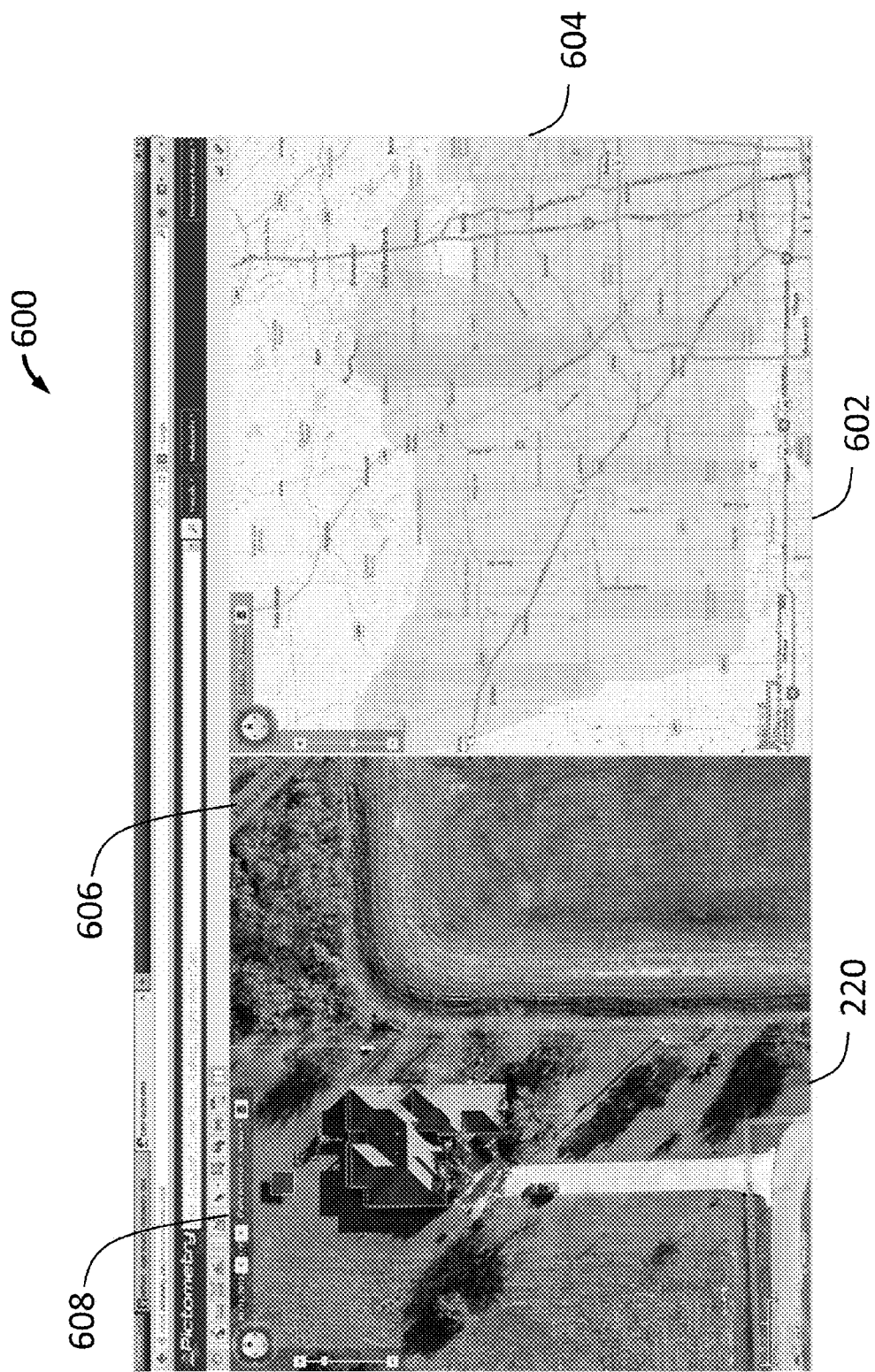
FIG. 6 is an exemplary screen shot of an image and a geospatial depiction of status of the image in accordance with the present disclosure on a display of an operator user device.

FIG. 6 is an exemplary screen shot 600 of an exemplary system in accordance with the present disclosure on a display 132 on a user device 116. In one embodiment, the display 132 may display a navigable map 602 containing information indicative of which geographic areas have in-process captured images 220 available for early access viewing. In this example, the shaded area 604 of the map 602 indicates the availability of the in-process captured images 220. In one example, multiple in-process captured image(s) 220 may be available for display and the map 602 may indicate multiple image availability through changes in shading of the shaded area 604. For example, darker shading may indicate that more in-process captured images 220 are available than in lighter shaded areas. In one example, the shading is one or more color. In one embodiment, the map 602 may contain information as to the status of the in-process captured images 220.

The system may allow a user to select one or more geographic areas of interest in the map 602, for example, by selection of points, parcels, objects, buildings, geographic areas, input of an address, latitude longitude, coordinates, etc. The selection may send a signal to the server processor 126 indicative of the geographic area of interest. The server processor 126 may then query the geospatial database 210 for one or more records 212 containing corresponding geographic information, such as may be contained in the geographic image boundary field. As previously described, the server processor may then locate and display the in-process captured image(s) 220 for the geographic area of interest selected. In this example, the in-process captured image 220 is displayed adjacent to the map 602. The in-process captured images 220 may be displayed with the status indicator, such as badge 606, overlaid with the image. For example, in FIG. 6, the badge 606 is across the upper right corner of the image. Of course, it should be understood that the status indicator may be displayed in other ways, for example, as a text field 608. It should also be understood that the in-process captured images 220 may be made available in other ways, such as individual screens or reports.

CONCLUSION

Currently, access to complex data-rich images may require significant wait times while the images are being processed. The problem may be addressed, for example, with system and methods for providing early access to the images during the processing stage, while avoiding costly iterative data ingestion to the geospatial database, through the use of placeholder records in the geospatial database and secondary storage locations for the in-process images.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

It should be understood that not all of the steps described are necessary or necessarily in the order described and that one or more of the steps may be executed on different portions of the computer system 100.

What is claimed is:

1. A computer system comprising one or more non-transitory computer readable mediums storing computer executable code that when executed by one or more servers of the computer system cause the one or more servers to:
generate and store a plurality of placeholder records for captured images within a geospatial database, each of the placeholder records having first information identifying a particular captured image and including at least one geographic image boundary field containing information indicative of a real-world geographic area depicted within the image, an image file location field, and an image status field;
receive a plurality of signals from one or more processing computer, at least two of the signals having the first information identifying particular captured images, and second information indicative of updates indicating a change in at least one of an image file location and image processing status for the captured images identified by the first information; and populating at least one of the image file location field and the image status field of the placeholder records within the geospatial database with the second information indicative of updates indicating a change in at least one of the image file location and image processing status for the captured images identified in the first information.

2. The computer system of claim 1, wherein the placeholder records have or are linked to:

at least one metadata field adapted to store geo-location information for a captured image, and at least one image raster data field adapted to store at least a portion of the captured image, and wherein the computer executable code is adapted to cause the one or more servers to populate the at least one metadata field and the at least one image raster data field after at least two processing steps have been completed for the captured images.

3. The computer system of claim 2, wherein more than two processing steps must be completed to fully process the captured images, and wherein the computer executable code is adapted to cause the one or more servers to update or populate the at least one metadata field and the at least one image raster data field after processing of the captured images is completed.

4. The computer system of claim 1, wherein the image file location field for each captured image includes information identifying a project directory on at least one processing drive.

5. The computer system of claim 4, wherein the information of the image file location field identifies a filename and project directory accessible by the one or more processing computer.

6. The computer system of claim 1, wherein the image file location for each captured image includes logic for accessing geo-location data associated with the captured image.

7. A computer system comprising one or more non-transitory computer readable mediums storing computer executable code that when executed by one or more servers of the computer system cause the one or more servers to:

receive a request for at least one image of a geographic area from a client application of an operator user device;

query records within a geospatial database to locate one or more records of images accessible by the geospatial database and depicting at least a portion of the geographic area;

for at least one record located in the query:

read a first field within the record indicating a status of the image, wherein the status of the image is based on at least one of a status of post-capture image processing and whether the image is in post-capture image processing;

read a second field within the record responsive to the status of the image indicating that the image is not stored in the geospatial database, the second field having information indicative of a location of the image in a non-transient memory; and present the image to the client application of the operator user device utilizing the information of the second field to identify the location of the image in the non-transient memory.

8. The computer system of claim 7, wherein the post-capture image processing includes at least one of color-balancing the image, quality control processing of the image, and geo-referencing the image.

9. The computer system of claim 7, wherein the non-transient memory is at least one processing drive.

10. The computer system of claim 9, wherein the image is retrieved from an image file stored on the at least one processing drive, rather than from the geospatial database, and then presented to the client application of the operator user device.

* * * * *